(12) United States Patent
Kawaski et al.

(10) Patent No.: US 11,829,443 B2
(45) Date of Patent: Nov. 28, 2023

(54) AUGMENTATION OF VIDEO DATASETS FOR MACHINE LEARNING TRAINING

(71) Applicant: International Business Machines Corporation, Armonk, NY (US)

(72) Inventors: Hiroki Kawaski, Kanagawa (JP); Shingo Nagai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 17/214,983

(22) Filed: Mar. 29, 2021

(65) Prior Publication Data

US 2022/0309289 A1  Sep. 29, 2022

(51) Int. Cl.
| | |
|---|---|
| *G06F 18/214* | (2023.01) |
| *G06N 20/00* | (2019.01) |
| *G06T 7/11* | (2017.01) |
| *G06V 20/40* | (2022.01) |

(52) U.S. Cl.
CPC ......... *G06F 18/2148* (2023.01); *G06N 20/00* (2019.01); *G06T 7/11* (2017.01); *G06V 20/49* (2022.01); *G06T 2207/10016* (2013.01); *G06T 2207/20081* (2013.01); *G06T 2207/20132* (2013.01)

(58) Field of Classification Search
CPC .... G06F 18/2148; G06N 20/00; G06V 20/41; G06V 20/49; G06V 10/774; G06T 7/11; G06T 2207/20132; G06T 2207/10016; G06T 2207/20081
USPC ......................................................... 382/155
See application file for complete search history.

(56) References Cited

U.S. PATENT DOCUMENTS

| | | |
|---|---|---|
| 2017/0133054 A1 | 5/2017 | Song |
| 2018/0084310 A1 | 3/2018 | Katz |
| 2020/0110936 A1 | 4/2020 | Hares |
| (Continued) | | |

FOREIGN PATENT DOCUMENTS

WO     2020038108 A1     2/2020

OTHER PUBLICATIONS

International Search Report and Written Opinion, dated Jul. 20, 2022, International Application No. PCT/EP2022/058223, 16 pages.
(Continued)

*Primary Examiner* — Kenny A Cese
(74) *Attorney, Agent, or Firm* — Brian M. Restauro

(57) ABSTRACT

Disclosed are techniques for augmenting video datasets for training machine learning algorithms with additional video datasets that are cropped copies of the video datasets. Frames of a received video dataset are divided into a plurality of subframes. For each subframe, a count is tallied corresponding to the cumulative number of pixels changed across the frames of the received video. Counts are compared to determine which subframe includes the most changed pixels across the frames of the video dataset, which is selected as a cropping candidate. The cropping candidate is used to generate copies of the video dataset that are cropped to include at least the cropping candidate and exclude at least some of the remaining portions of each frame of the video dataset that are outside of the cropping candidate. In some embodiments, boundaries of cropping candidates are transformed to generate a plurality of cropped variations of the video dataset.

18 Claims, 9 Drawing Sheets

(56) References Cited

U.S. PATENT DOCUMENTS

| | | | |
|---|---|---|---|
| 2020/0151458 A1 | 5/2020 | Son | |
| 2021/0304574 A1* | 9/2021 | Ramanathan | .......... H04N 23/65 |

OTHER PUBLICATIONS

Kang Kai et al., "Object Detection in Videos with Tubelet Proposal Networks," 2017 IEEE Conference on Computer Vision and Pattern Recognition (CVPR), IEEE Computer Society, Jul. 21, 2017, p. 889-897.

Wang Limin et al., "Temporal Segment Networks: Towards Good Practices for for Deep Action Recognition," Sep. 17, 2016, SAT 2015 18th International Conference, Austin, TX, [Lecture Notes in Computer Science], Springer, Berlin, Heidelbert, pp. 20-36.

Zhao, Y., et al., "Temporal Action Detection with Structured Segment Networks", Sep. 18, 2017, 10 pps., Computer Vision Laboratory, ETH Zurich, Switzerland.

Budvytis, I., et al., "Large Scale Labelled Video Data Augmentation for Semantic Segmentation in Driving Scenarios", downloaded from the internet on Mar. 2, 2021, 8 pps., University of Cambridge, United Kingdom, Belgium, <https://ieeexplore.ieee.org/document/8265246>.

Choi, J., "Action Recognition with Knowledge Transfer", Dissertation submitted to the Faculty of the Virginia Polytechnic Institute and State University in partial fulfillment of the requirements for the degree of Doctor of Philosophy in Computer Engineering, Dec. 10, 2020, 134 pps., Blacksburg, Virginia <https://vtechworks.lib.vt.edu/bitstream/handle/10919/101780/Choi_J_D_2021.pdf?sequence=1&isAllowed=y>.

Kim, T., et al., "Learning Temporally Invariant and Localizable Features via Data Augmentation for Video Recognition", Aug. 13, 2020, 18 pps., Seoul, South Korea, <https://arxiv.org/pdf/2008.05721.pdf>.

Kitakaze, H., et al, "Recognittion Rate Improvement of Injurious Bird Recognition System by Increasing CNN earning Image using Data Augmentation", The Japanese Journal of the Institute of Industrial Applications Engineers, Aug. 22, 2019, 8 pps., vol. 7, No. 2.

Kopuklu, O., et al, "Video Augmentation Techniques for Deep Learning", 2020, 6 pps., <https://github.com/okankop/vidaug>.

Zhang, Y., et al, "Self-Paced Video Data Augmentation with Dynamic Images Generated by Generative Adversarial Networks", Sep. 16, 2019, 9 pps., Beijing, China <https://arxiv.org/abs/1909.12929>.

Yun, S., et al, "VideoMix: Rethinking Data Augmentation for Video Classification", Dec. 7, 2020, 15 pps. < https://arxiv.org/pdf/2012.03457.pdf>.

* cited by examiner

AUGMENTATION OF VIDEO DATASETS FOR MACHINE LEARNING TRAINING

BACKGROUND

The present invention relates generally to the field of machine learning training data augmentation, and more particularly to augmenting video datasets for machine learning training.

Machine learning (ML) is the study of computer algorithms which automatically improve through experience. It is typically viewed as a subset of artificial intelligence (AI). Machine learning algorithms typically construct a mathematical model based on sample data, sometimes known as "training data", in order to determine predictions or decisions without being specifically programmed to do so. Typically, machine learning models require a large quantity of data in order for them to perform well. Often, when training a machine learning model, one needs to collect a large, representative sample of data from a given training set. Data from the training set can be as varied as a corpus of text, a collection of images (or videos), and data collected from individual users of a service.

Video refers to an electronic medium for the recording, copying, playback, broadcasting, and display of moving visual media. Some defining characteristics of a video include: (i) frame rate; and (ii) resolution of the underlying still images, including aspect ratio of the images. A frame rate describes the number of still pictures per unit of time of a given video, often in images (or frames) per second, where a frame is a single image taken from an instant in time in the video. For example, a frame rate of sixty frames per second would describe a video where sixty frames of video are viewed for every second of playback of the video, with each frame displayed for approximately $1/60^{th}$ of one second of time. Resolution of the underlying still images refers to the dimensions, in individual pixels, of the underlying still images (such as a 1000 pixels by 1000 pixels image, or 1000×1000). Aspect ratio refers to the ratio between one dimension of the underlying images to the other dimension of the underlying images (where a 2:1 ratio would indicate that each image is twice as wide, in pixels, than the image is tall, also in pixels).

Cropping refers to the removal of unwanted outer areas from a photographic or illustrated image (or video). The process usually consists of the removal of some of the peripheral areas of an image to remove extraneous elements from the picture, to modify its framing, to alter the aspect ratio, or to accentuate or isolate the subject matter from its background. Depending on the application, this can be performed on a physical photograph, artwork, or film footage, or it can be achieved on digital media through image editing software.

In the field of digital imaging, a pixel, or picture element, is a hypothetical, theorized square element in a raster image, or the smallest addressable element in an all points addressable display device; so it is the smallest controllable element of a picture represented on an electronic screen.

SUMMARY

According to an aspect of the present invention, there is a method, computer program product and/or system that performs the following operations (not necessarily in the following order): (i) receiving a machine learning training dataset including at least one video; and (ii) for at least one video of the machine learning training dataset: (a) dividing frames of the at least one video into sets of smaller subframes, where each subframe corresponds to the same area of a given frame throughout the at least one video, (b) determining, for each subframe of the at least one video, a cumulative quantity of pixel differences between a given subframe of a first frame and the given subframe of a final frame, (c) selecting a subframe of the frames of the at least one video for cropping based, at least in part, on the cumulative quantity of pixel differences, (d) cropping at least one copy of the at least one video based, at least in part, on the selected subframe of the frames of the at least one video, and (e) augmenting the machine learning training dataset with the cropped at least one copy of the at least one video.

DETAILED DESCRIPTION

Figure 1:
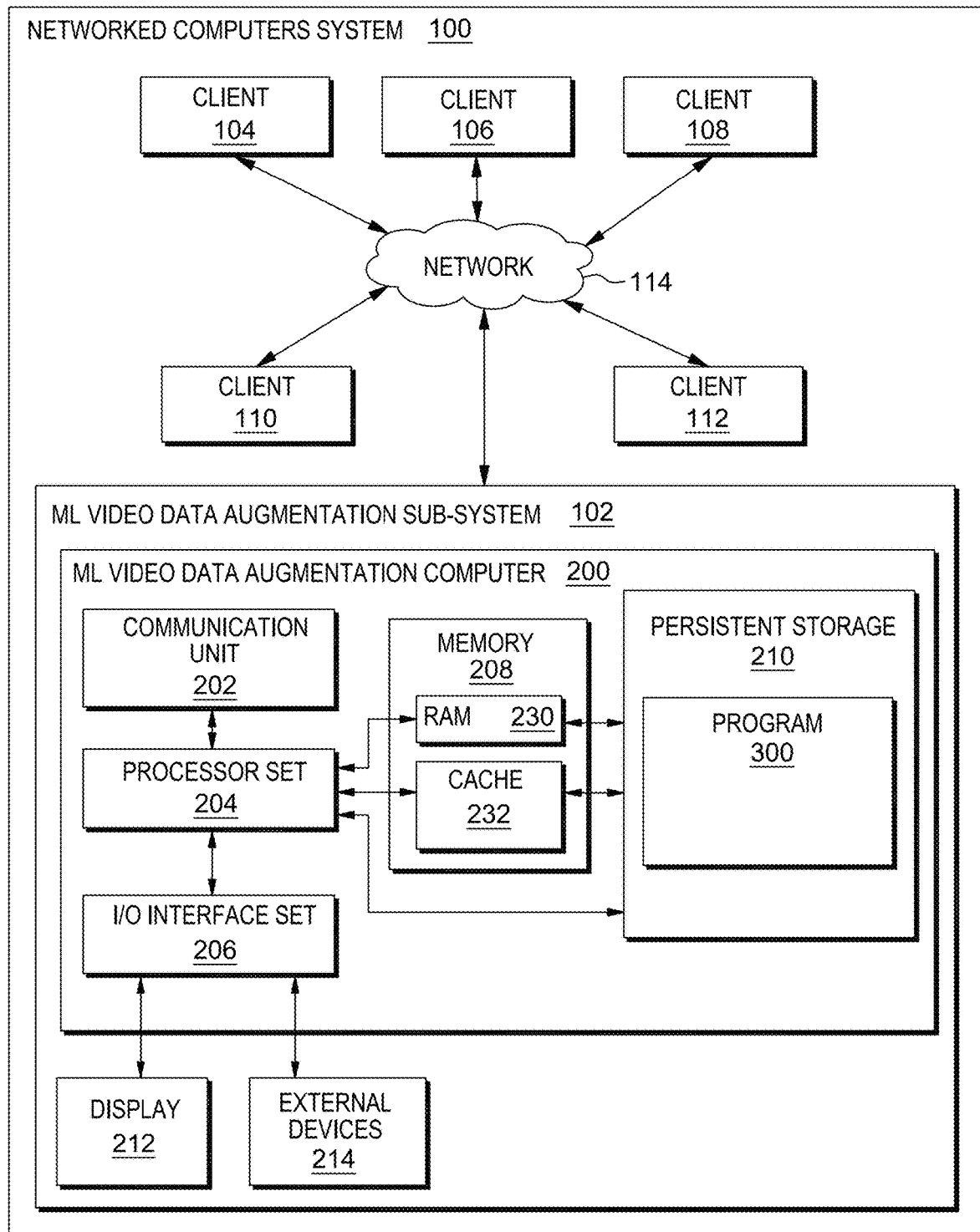
FIG. 1 is a block diagram view of a first embodiment of a system according to the present invention.

Some embodiments of the present invention are directed to techniques for augmenting video datasets for training machine learning algorithms with additional video datasets that are cropped copies of the video datasets. Frames of a received video dataset are divided into a plurality of subframes. For each subframe, a count is tallied corresponding to the cumulative number of pixels changed across the frames of the received video. The counts are compared to determine which subframe includes the greatest number of changed pixels across the frames of the video dataset, which is selected as a cropping candidate. The cropping candidate is used to generate copies of the video dataset that are cropped to include at least the cropping candidate and exclude at least some of the remaining portions of each frame of the video dataset that are not within the cropping candidate. In some embodiments, boundaries of cropping candidate are transformed to generate a plurality of cropped variations of the video dataset.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium sometimes referred to as a machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device(s) 214. External device(s) 214 will typically include devices such as a keyboard, keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
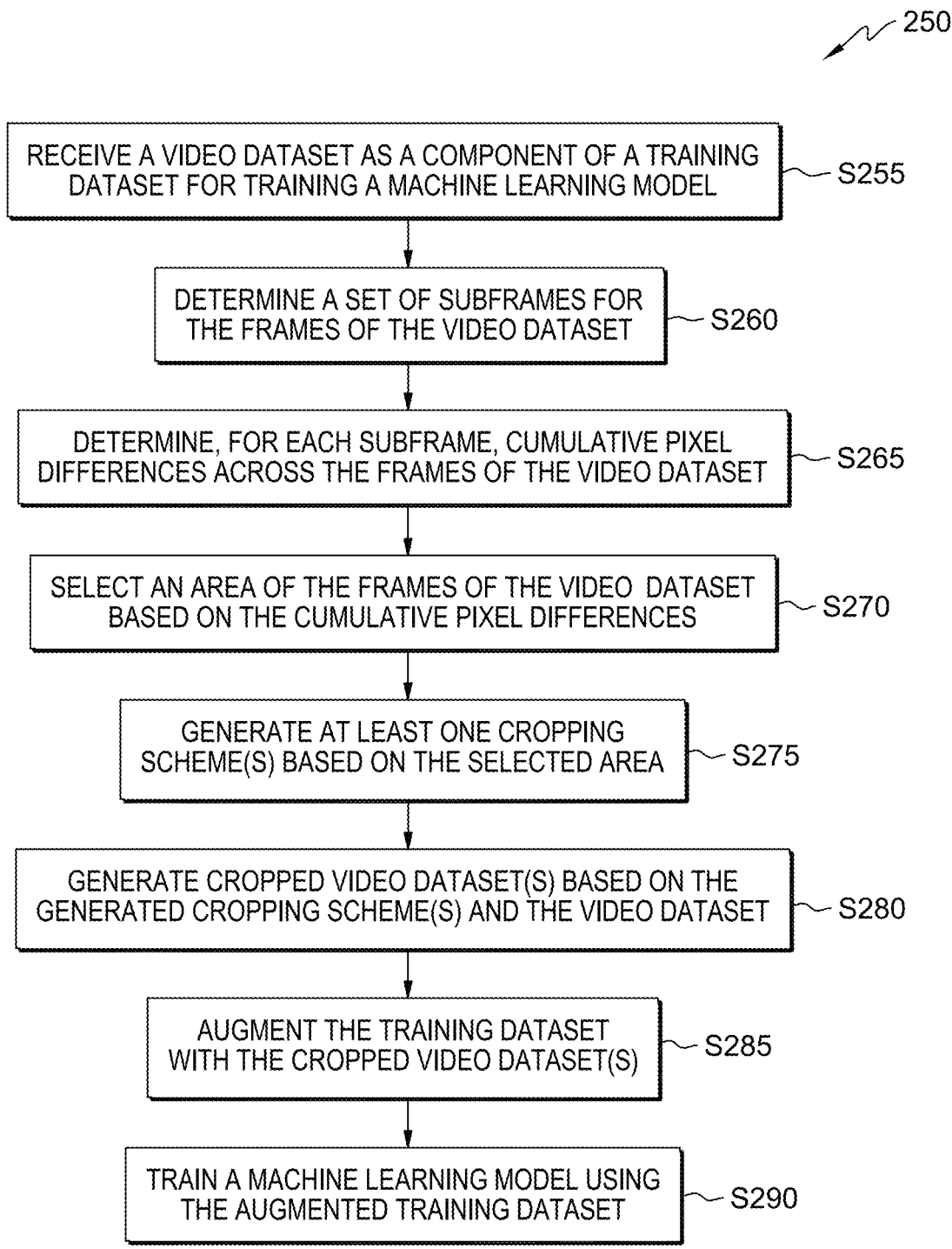
FIG. 2 is a flowchart showing a first embodiment method performed, at least in part, by the first embodiment system.
Figure 3:
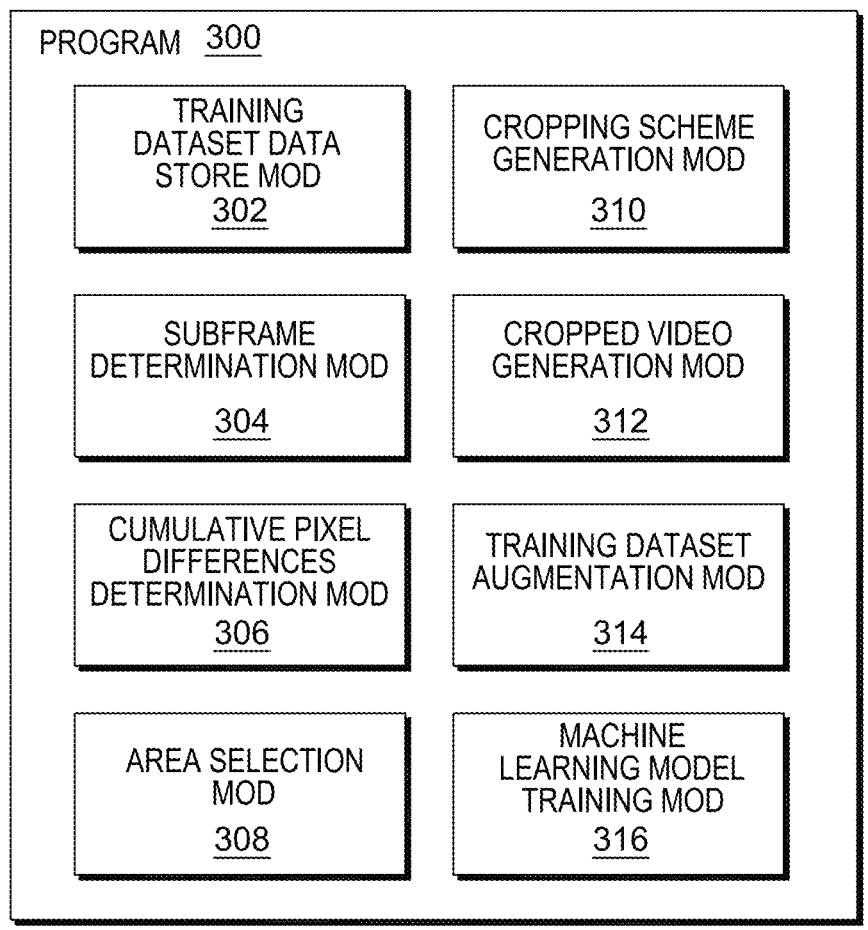
FIG. 3 is a block diagram showing a machine logic (for example, software) portion of the first embodiment system.
Figure 4:
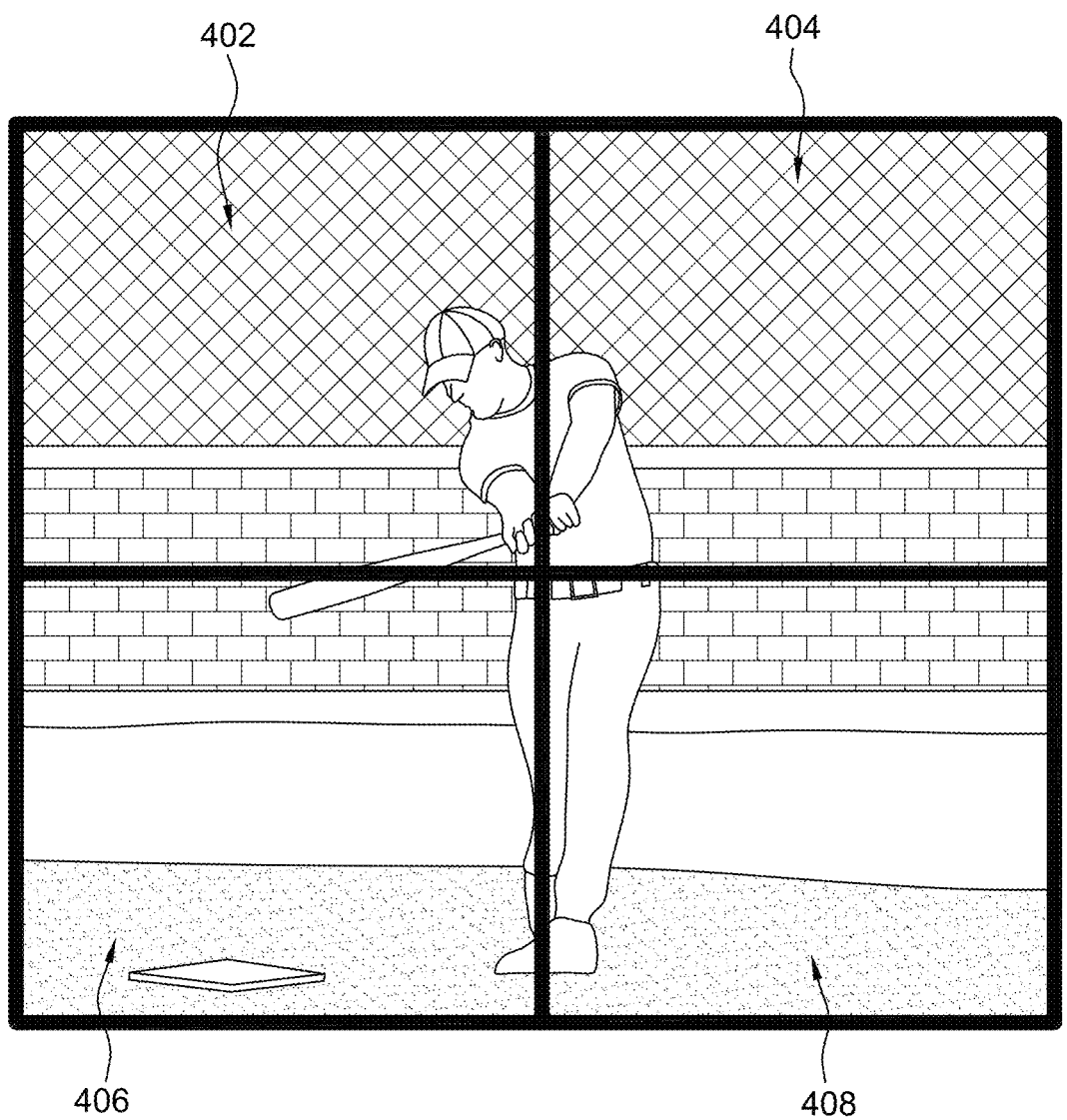
FIG. 4 is a screenshot view showing an example arrangement of subframes from an example frame.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2, 3, 4, 5A, 5B, 5C and 5D.

Processing begins at operation S255, where training dataset data store module ("mod") 302 receives video dataset as a component of a training dataset for training a machine learning model. In this simplified embodiment, the video dataset is a video of a baseball player swinging a baseball bat as if to strike a baseball thrown during a baseball pitch. This video dataset is part of a training dataset for training a machine learning model for identifying baseball players swinging baseball bats to hit baseball pitches. The video dataset is five seconds long, at a frame rate of ten frames per second for a total of fifty total frames, numbered one through fifty. The resolution of each frame is 500 pixels by 500 pixels. These numbers are for illustrative purposes only; other frame rates, video lengths, and resolutions are all applicable to videos as conceived by this simplified embodiment. The video dataset also includes labels corresponding to when the baseball player begins swinging the baseball bat and completes the swing of the baseball bat, corresponding to a label assigned to certain frames of the video dataset based on the content of the frames. The content of the frames of the video dataset are for illustrative purposes only; video datasets corresponding to different types of content where quantities of changed pixels are relevant are candidates for the techniques of the simplified embodiments. For example, other video datasets recording other types of movements of physical or animated entities or objects.

Processing proceeds to operation S260, where subframe determination mod 304 determines a set of subframes for the frames of the video dataset. In this simplified embodiment, each frame of the video dataset is divided into a set of four subframes, each subframe comprising one quarter of the frame, resulting from bisecting the frame in half along its length and height, or four squares of equal area, where each subframe has a resolution of 250 pixels by 250 pixels. This is shown in frame 400 of FIG. 4, which includes top left subframe 402, top right subframe 404, bottom left subframe 406, and bottom right subframe 408. Frame 400 is an example of how every frame in the video dataset is divided into subframes, with every frame in the video dataset divided into the same set of subframes (arranged in the same manner and comprising the same areas of their respective frames). The subframes of a given frame correspond to divisions of the given frame, where each subframe corresponds to an equal portion of the frame, and the In some alternative embodiments, determining the set of subframes includes dividing the frame into a different arrangement of subframes (for example, dividing the frame into nine subframes of a three by three arrangement of subframes, or sixteen subframes of a four by four arrangement, twenty five subframes of a five by five arrangement . . . or n by n subframes). The subframes correspond to the same "area" of their respective frames across each successive frame in the video dataset. For example, if the frames of the video dataset were divided in half horizontally, each frame would be divided in the same way such that one subframe corresponds to the half of the frame that is above an invisible line running down the horizontal center of the frame and a second subframe corresponds to the half of the frame that is below the invisible line running down the horizontal center of the frame, and each frame would be divided in the same way into the same arrangement of subframes (where one subframe is the top half and one subframe is the bottom half).

This also applies where the frames are divided into more than two subframes. For example, if the frames are divided into four subframes by dividing the frame in half along the horizontal axis and vertical axis, and each subframe corresponds to separate areas of the frame covering 25% of the frame, each subframe will respectively correspond to the same area of their respective frames. A first subframe of a first frame and a first subframe of a second frame will correspond to the same areas of their respective frames, such as "top left quarter." In some alternative embodiments, the arrangement of subframes is determined based, at least in part, on the aspect ratio of the frames, in order to preserve the aspect ratio of the frames into the subframes, so that the subframes have the same aspect ratio as the corresponding frames.

Processing proceeds to operation S265, where cumulative pixel differences determination mod 306 determines, for each subframe, cumulative pixel differences across the frames of the video dataset. In this simplified embodiment, a cumulative quantity of changed pixels is calculated for each subframe across the frames of the video dataset. For example, as each frame in this simplified embodiment has been divided into four subframes, there are four separate cumulative pixel difference sums, each corresponding to the total cumulative changes in pixels for the respective subframe from each frame in the video dataset. If, for example, the frames of the video dataset were divided into four equal subframes corresponding to 25% of a given frame, including (i) a top left subframe, (ii) a top right subframe, (iii) a bottom left subframe, and (iv) a bottom right subframe, and the video dataset has fifty frames, then the cumulative pixel differences would comprise (i) a sum of changed pixels in the top left subframe of frames one through fifty of the video dataset, (ii) a sum of changed pixels in the top right subframe of frames one through fifty of the video dataset, (iii) a sum of changed pixels in the bottom left subframe of frames one through fifty of the video dataset, and (iv) a sum of changed pixels in the bottom right subframe of frames one through fifty of the video dataset. In this simplified embodiment, the top left subframe has a cumulative quantity of changed pixels of 10000 pixels, the top right subframe has a cumulative quantity of changed pixels of 5000 pixels, the bottom left subframe has a cumulative quantity of changed pixels of 4000 pixels, and the bottom right subframe has a cumulative quantity of changed pixels of 3000 pixels.

Processing proceeds to operation S270, where area selection mod 308 selects an area of the frames of the video dataset based on the cumulative pixel differences. In this simplified embodiment, the area of the frames of the video dataset is one subframe from the set of subframes previously determined at S260 selected based on which subframe has the largest cumulative pixel differences as established by the cumulative quantities of changed pixels determined at S265. As the top left subframe has the largest cumulative quantity of changed pixels, with 10000 pixels changed across frames 1 through frame 50, the top left subframe is the "selected area" for this simplified example embodiment. In some alternative embodiments, the selected area is explicitly designated using only the first frame of the video dataset. In yet further alternative embodiments, the selected area is automatically detected using an object detection model applied to at least some frames of the video dataset.

Figure 5A:
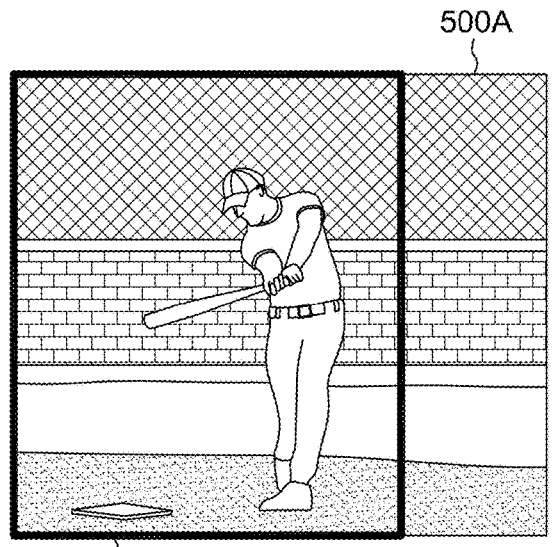
FIG. 5A is a first example cropping screenshot view generated by the first embodiment system.
Figure 5B:
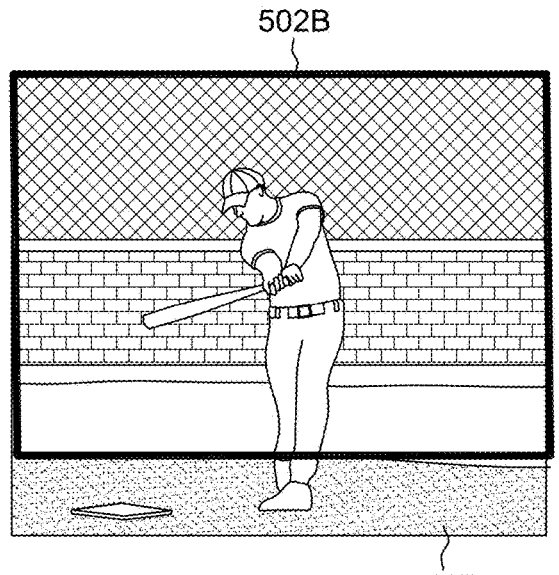
FIG. 5B is a second example cropping screenshot view generated by the first embodiment system.
Figure 5C:
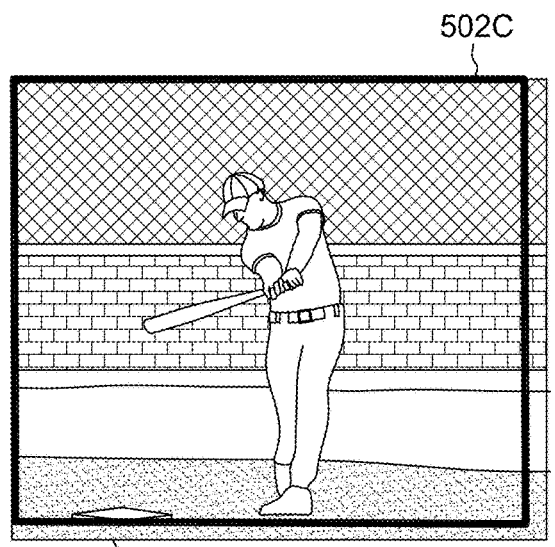
FIG. 5C is a third example cropping screenshot view generated by the first embodiment system.
Figure 5D:
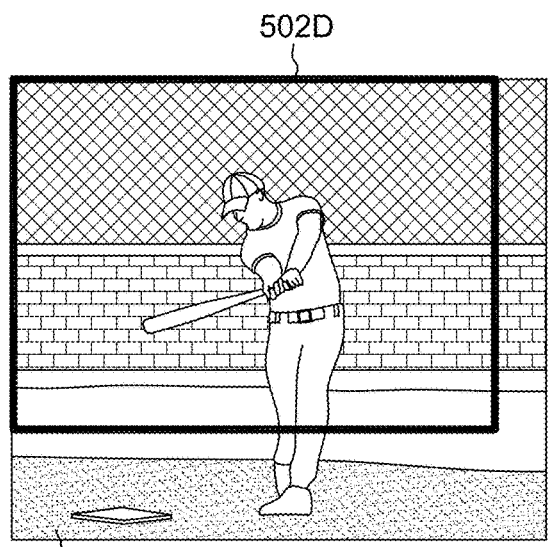
FIG. 5D is a fourth example cropping screenshot view generated by the first embodiment system.

Processing proceeds to operation S275, where cropping scheme generation mod 310 generates at least one cropping scheme(s) based on the selected area. In this simplified embodiment, the selected area is the foundation of the generated cropping scheme(s). That is, the selected area must appear in its entirety in any cropping scheme, and other areas (or subframes) can be entirely or partially excluded. First, to generate at least one cropping scheme(s), a set of candidate cropping boundaries are generated from the selected area (or subframe) by enlarging (for example, by way of an expansion transformation) a boundary defined by the selected area into multiple copies of the boundary extended to different sizes (in such a manner to not extend the boundary of the enlarged selected areas beyond the boundary of the frames), where the enlarged/extended/expanded boundary now includes additional portions of the frame beyond the selected area. Next, another transformation is applied to the cropping candidate boundaries, corresponding to moving (alternatively sliding or repositioning) the given cropping candidate boundary to generate more variations of cropped frames including selected area. In this simplified embodiment, four cropping candidate boundaries are generated based on the selected area, as shown in an example frame of the video dataset illustrated in FIGS. 5A, 5B, 5C and 5D. FIG. 5A includes frame 500A and first cropping boundary 502A. FIG. 5B includes frame 500B and second cropping boundary 502B. FIG. 5C includes frame 500C and third cropping boundary 502C. FIG. 5D includes frame 500D and fourth cropping boundary 502D. Each cropping boundary excludes at least some portions of their respective frames, while including at least the selected area.

In some alternative embodiments, the candidate cropping boundaries are constrained to maintain the same aspect ratio of the underlying video dataset. In yet further alternative embodiments, the degree of enlargement applied to the selected area is determined based on a rule corresponding to the cumulative pixel differences of the subframes. For example, a set of thresholds corresponding to percentages of similarity between the cumulative quantity of changed pixels in the selected area compared to an average of cumulative quantity of changed pixels for the remaining subframes (excluding the subframe of the selected area), with higher thresholds corresponding to greater similarity between cumulative changed pixels in the selected area and the remaining subframes, where the highest threshold results in the largest degree of enlargement. For example, where there is 90% or more similarity (or no more than 10% of difference exists between the cumulative quantity of changed pixels in the selected area and the average of cumulative quantity of changed pixels for the remaining subframes (excluding the subframe of the selected area), the maximum enlargement is applied, such as a two or three times multiplier. Greater similarity between a selected subframe and the other subframes can indicate that the subject action of a given video may be spread out over more than one subframe. In even further alternative embodiments, the distance of movement applied in sliding the enlarged candidate cropping boundaries is determined based on rules, such as rules similar to the above rule for the degree of enlargement, where the highest threshold corresponds to the most distance of movement. In yet further alternative embodiments, the degree of enlargement or distance of movement are predetermined, either for each video in the testing dataset separately or once for the testing dataset.

Processing proceeds to operation S280, where cropped video generation mod 312 generates cropped video dataset(s) based on the generated cropping scheme(s) and the video dataset. In this simplified embodiment, cropped video generation mod 312 generates one video dataset for each cropping candidate boundary, or four cropped video datasets. A first cropped video dataset is generated based on first cropping boundary 502A of FIG. 5A by cropping each frame of the video dataset received at S255 according to first cropping boundary 502A. A second cropped video dataset is generated based on second cropping boundary 502B of FIG. 5B by cropping each frame of the video dataset received at S255 according to second cropping boundary 502B. A third cropped video dataset is generated based on third cropping boundary 502C of FIG. 5C by cropping each frame of the video dataset received at S255 according to third cropping boundary 502C. A fourth cropped video dataset is generated based on fourth cropping boundary 502D of FIG. 5D by cropping each frame of the video dataset received at S255 according to fourth cropping boundary 502D.

Processing proceeds to operation S285, where training dataset augmentation mod 314 augments the training dataset with the cropped video dataset(s). In this simplified embodiment, the four cropped video datasets, including the first cropped video dataset, the second cropped video dataset, the third cropped video dataset, and the fourth cropped video dataset, are labeled using the same labels as in the video dataset received at S255, because the sequence of frames are identical to the underlying video dataset received at S255. Each of the four cropped video datasets are included into the training dataset, joining the video dataset received at S255 that was already part of the training dataset, increasing the number of video datasets in the training dataset from one video dataset to five total video datasets.

Processing proceeds to operation S290, where machine learning model training mod 316 trains a machine learning model using the augmented training dataset. In this simplified embodiment, there is a machine learning model that is being trained to identify video clips of baseball players swinging baseball bats, and is being trained using the augmented training dataset. Each video dataset in the training dataset is provided to the machine learning model as input and the machine learning model generates outputs labels for each frame of the video datasets based on the content and sequence of the frames, which is then verified against the labels provided with the video datasets in the training dataset to further refine the machine learning model for identifying video clips of baseball players swinging baseball bats. The machine learning model described in this simplified embodiment is for illustrative purposes only, and other types of machine learning models and/or algorithms are suitable candidates for the techniques of this simplified embodiment.

III. Further Comments and/or Embodiments

Some embodiments of the present invention recognize the following facts, potential problems and/or potential areas for improvement with respect to the current state of the art: (i) currently, deep learning technology, whose input is image data, is mainly used for classifying images and detecting objects in images; (ii) its accuracy and inference speed have been rapidly improving in recent years; (iii) similarly, in order to detect the movement and behavior of an object in a video data, action detection has been developed; (iv) action detection is a deep learning technology whose input is video data and takes into account changes in the time axis direction; (v) action detection is a technology that infers the time range of the specified action from the start time point to the end time point in order to detect where the specified action is performed in the input video; (vi) as an example application, detection of only shooting motion parts from a video of a soccer game is conceivable; (vii) there is Structure Segment Networks (hereinafter referred to as SSN) as a typical model of this technology, but the preprocessing method for improving the detection accuracy has not been as established as the models of classifying still images and detecting objects in still images; (viii) the reason for it is that the data augmentation methods for video data have not been as established as those for image data; (ix) it has been demonstrated that the inference accuracy of a deep learning model can be improved by training the model with increasing the number of training data sets by changing the brightness and color of the underlying images; (x) for a deep learning model whose input is video data, it is also possible to apply a data augmentation method, such as those applied to still images, to all image frames of video data without considering the continuity in the video; and (xi) no standard data augmentation method using the feature derived from the continuity in a video has been established.

Some embodiments of the present invention recognize the following facts, potential problems and/or potential areas for improvement with respect to the current state of the art: (i) it is generally considered that it may sometimes be difficult to prepare training data of video data compared to image data in some cases; (ii) therefore, in order to increase the variation of training data, more effective data augmentation methods that utilize the characteristics of video are required; (iii) as a method for increasing video data, it is conceivable to cut out a part of each of the frames of a video to increase the variation of the video, which is called cropping; (iv) in the case of action detection which detects a target motion from a video, the accuracy of the detection could be improved by inputting the video data to a model after cutting out a part around an object in the target motion to remove the background and unnecessary objects and increasing the variation in position of the object in each frame; (v) however, on the contrary, if the main part of the target motion is cut out by cropping, the accuracy of the model would be greatly decreased; (vi) for example, in the use case of intending to detect a pitching motion from a baseball game video in the "THUMOS Challenge 2014" data set, it is necessary to avoid cropping such as removing the image of a pitcher; (vii) in such a case, it takes a lot of time and effort to visually determine the cropping range by watching the video of all training data; (viii) a new automated method for cropping will significantly reduce the cost and effort for data augmentation and improve accuracy of a model.

Some embodiments of the present invention may include one, or more, of the following operations, features, characteristics and/or advantages: (i) this invention provides a method of performing data augmentation by cropping frames while paying attention to the amount of pixel changes between adjacent frames in video data; (ii) as mentioned above, the method of cropping a part of each frame can greatly increase the training data by changing the way of the cropping; (iii) however, which part in the frame to crop depends on the content of the video and the action to be detected, requiring human visual judgement and annotation; (iv) therefore, when the number of videos is increased to ten times or more, the workload of making annotations with 10 variations will be required; (v) however, the amount of pixel changes between adjacent frames conceivably tends to be large in the part where the target motion is shown in the video; (vi) a technique for increasing the video data with the part of the target motion kept in the generated video by calculating the amount of pixel changes between frames for each video data used for training; (vii) and performing cropping in such a manner that the part whose amount of pixel change is largest is included; (viii) the training video data can be increased to 10 times or more depending the combination of conditions, by performing cropping with as many different sizes and center positions as possible in such a manner as to include the parts whose amount of pixel changes are largest; and (ix) therefore, enhancement not only in efficiency of training data preprocessing but also in accuracy of the deep learning model can be expected.

Some embodiments of the present invention may include one, or more, of the following operations, features, characteristics and/or advantages: (i) after a part whose amount of pixel change between adjacent frames in all of frames in a video is largest is specified, cropping is performed in such a manner as to include such part; (ii) and for the cropping, the number of new videos according to the conditions are created by using different area sizes and center positions; (iii) and all such videos are used for training for action detection to enhance accuracy in training of the model; (iv) in action detection, a label indicating a start time point and an end time point of an action in a video and the content of the action is added; (v) however, a video newly created by data augmentation is the same in action segment as the original video, and thus, in the present invention, no additional labelling is required; (vi) technique of determining a cropping candidate area and performing data augmentation; (vii) a step of performing data augmentation by cropping frames while paying attention to the amount of pixel changes between adjacent frames in video data; (viii) a step of increasing the video data with the part of the target motion kept in the generated video by calculating the amount of pixel changes between frames for each video data used for training and performing cropping in such a manner that the part whose amount of pixel change is largest is included; and (ix) a step of increasing the training video data by more than x times (e.g. 10 times) depending on the combination of conditions by performing cropping with as many different sizes and center positions as possible in such a manner as to include a part whose amount of pixel changes is largest.

Figure 6:
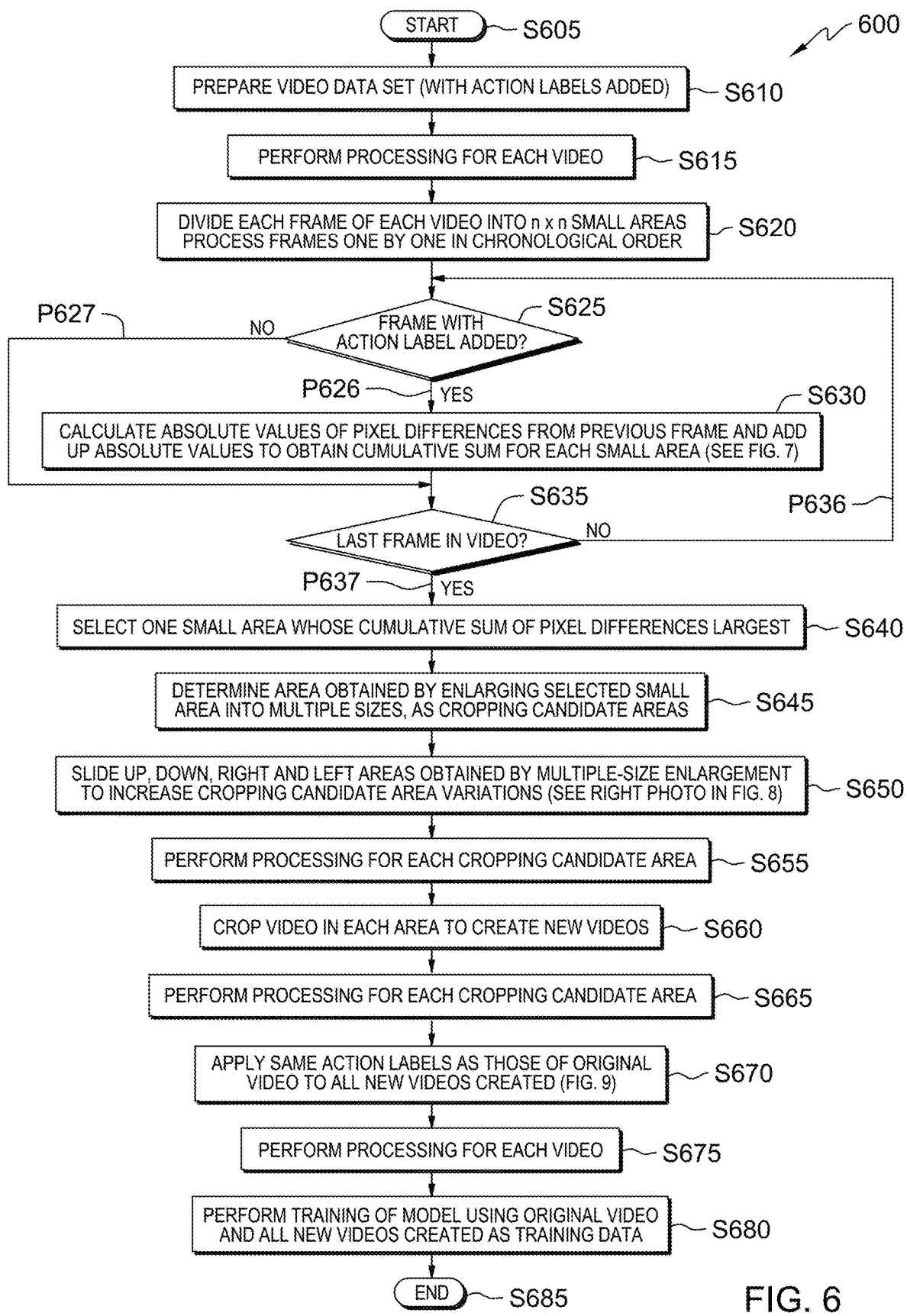
FIG. 6 is a flowchart showing a second embodiment method.

Flowchart 600 of FIG. 6 shows a method of action detection according to a second embodiment of the present invention, including the following steps: (i) start S605; (ii) step S610; (iii) video processing loop start S615; (iv) step S620; (v) step S625; (vi) yes path P626; (vii) no path P627; (viii) step S630; (ix) step S635; (x) no path P636; (xi) yes path P637; (xii) step S640; (xiii) step S645; (xiv) step S650; (xv) candidate cropping area processing loop start S655; (xvi) step S660; (xvii) candidate cropping area processing loop end S665; (xviii) step S670; (xix) video processing loop end S675; (xx) step S680; and (xxi) end S685. According to the method illustrated in flowchart 600, a data set of videos to be used for training is prepared and an action segment is manually labelled. Subsequently, specification of an action part and cropping are performed for each of the videos. For the action part specification, there are some methods that can be employed.

Figure 7:
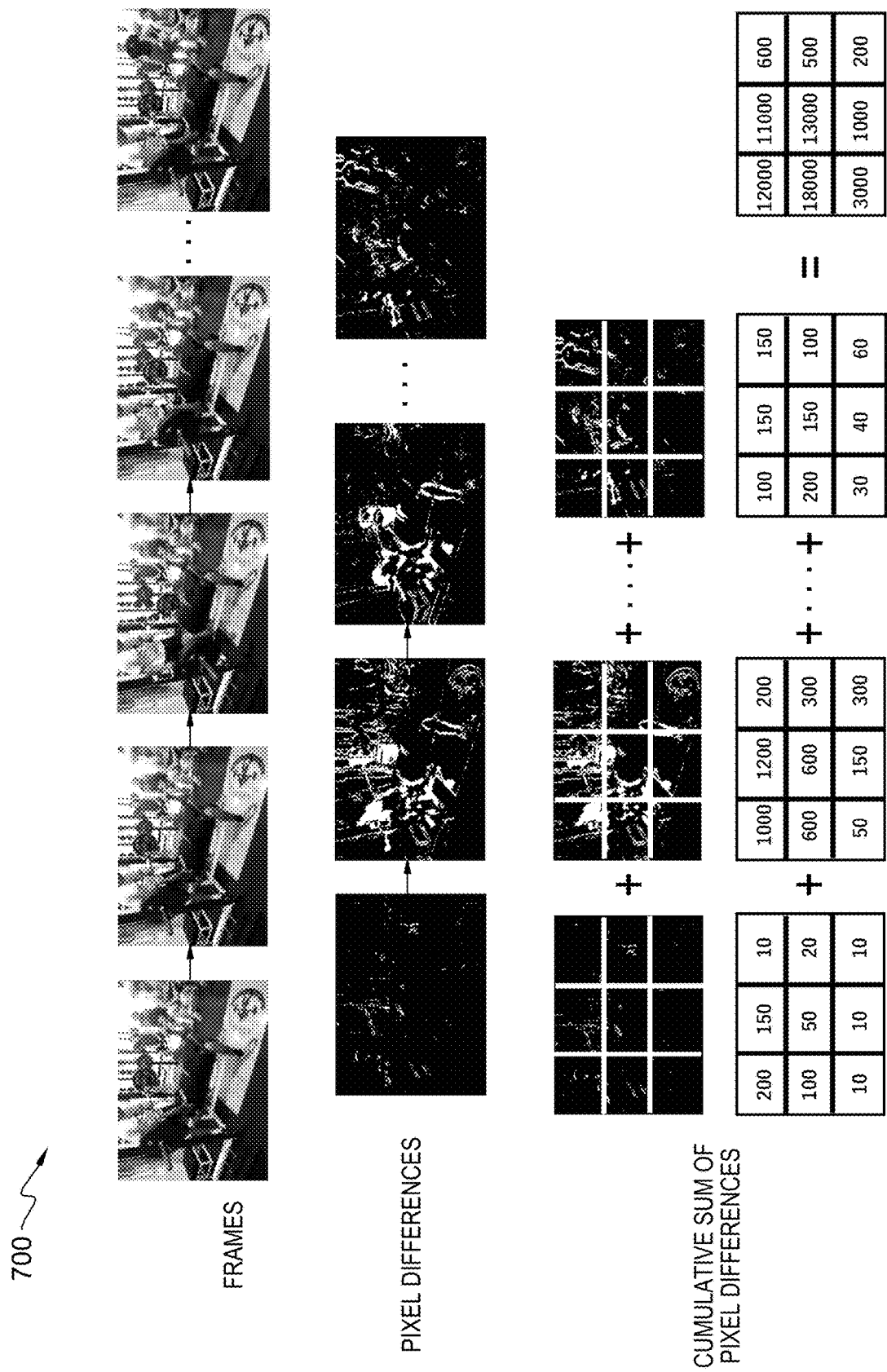
FIG. 7 is a screenshot view generated by the second embodiment method.

Screenshot 700 of FIG. 7 shows an example of steps S620 and S630 of flowchart 600 of FIG. 6 performed on an example video. In the method described in the flowchart in FIG. 6, each frame of each video is divided into n×n small areas. For each of the small areas, values obtained by binarization of absolute values of differences between pixels belonging to the small area between adjacent frames in the video are added up, and the small area whose cumulative sum is largest at the end is selected. Some alternative embodiments include a method of explicitly designating an area corresponding to the action part by viewing only a first frame of each video. Some other alternative embodiments include a method of specifying a cropping candidate area by automatically detecting an area of interest using an object detection model that detects a specific part of a still image.

Figure 8:
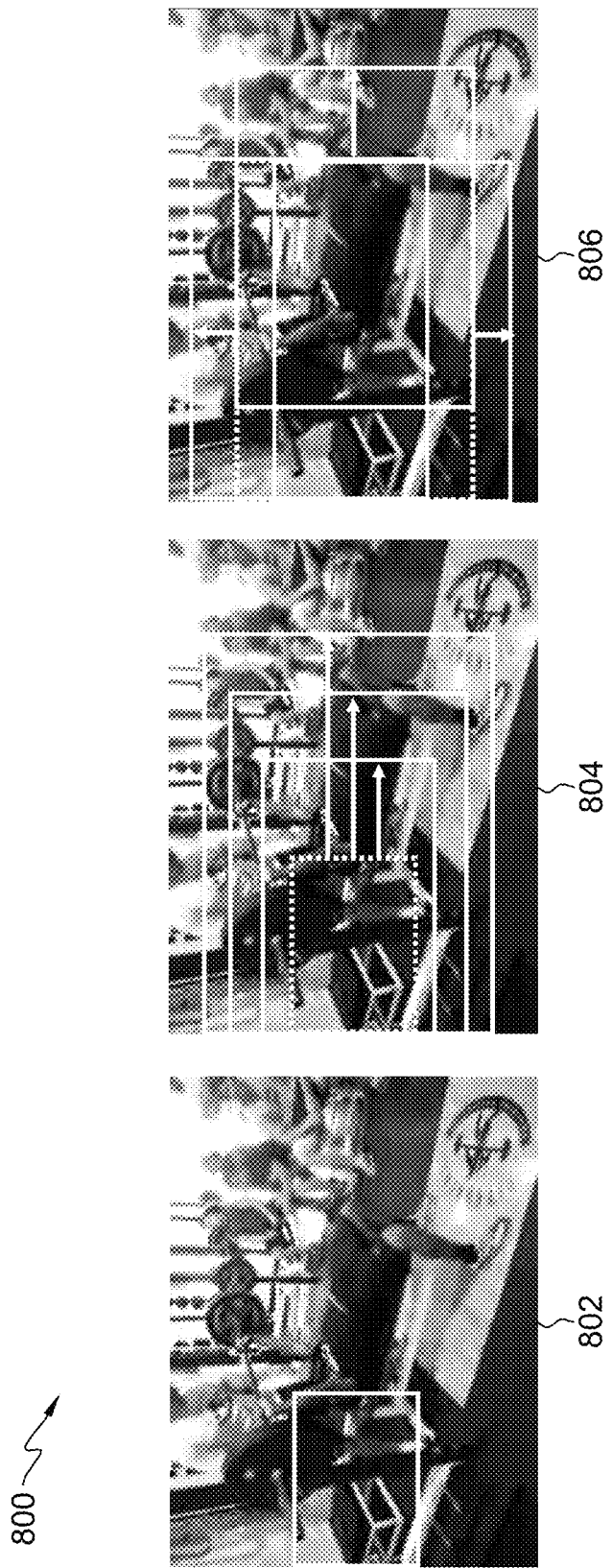
FIG. 8 is a screenshot view generated by the second embodiment method.

Shown in screenshot 800 of FIG. 8, the area selected (shown in 802) in the above method shown in flowchart 600 of FIG. 6 is enlarged into multiple sizes (804) and furthermore slid up, down, right and left (shown in 806) to increase cropping candidate area variations. The magnification factor of the enlargement and the width of the sliding may be, for example: (i) determined in advance irrespective of the contents of the videos; (ii) explicitly designated for each video; or (iii) determined based on a rule in consideration of the pixel differences calculated in the preceding processing.

Figure 9:
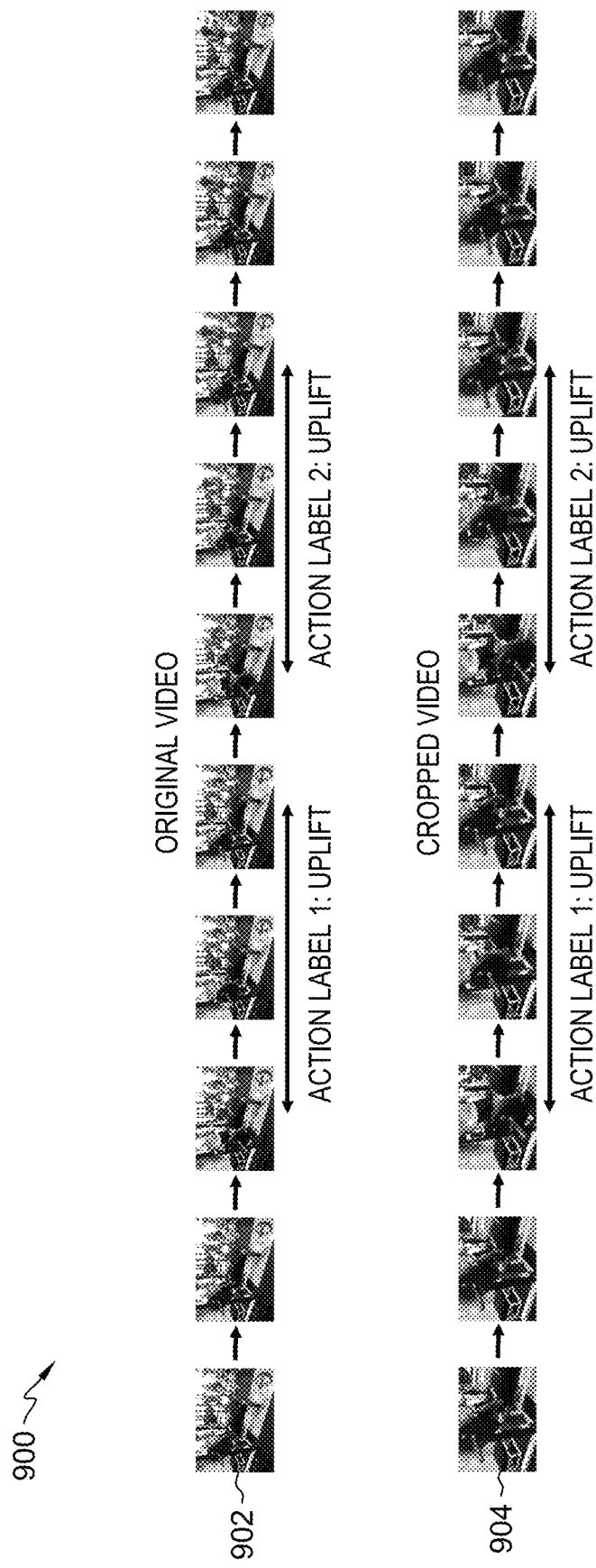
FIG. 9 is a screenshot view generated by the second embodiment method.

Subsequently, for each video, cropping is performed using all of the cropping candidate areas to create new videos and training of a deep learning model is performed using all of the increased video data. In this case, as illustrated in screenshot 900 of FIG. 9, regardless of which areas to crop, the action segment is the same in the cropped videos (shown as 904) as in the original video (shown as 902), and thus, for training, the label data of the original video data is applied to each of the increased video data.

Some embodiments of the present invention include some or all of the features described in the following example. A comparison test was performed under the below conditions using the "THUMOS Challenge 2014" data set, for verification of the effects of the method of the present invention. The dataset used is a video of a bench press in the "THUMOS Challenge 2014" data set. Labelling target action is the moment when a person lifts a barbell up was set as the action of a detection target. The training dataset includes five video files. Number of training labels is 90 (or 90 target action segments). Cropping conditions according to the method of the present invention: for each video, a cropping candidate area whose amount of pixel differences is largest was selected, and the candidate area was enlarged into two different sizes and then slid to triplicate the training data amount. The number of training datasets after application of the method of the present invention is now 270 (or 270 target action segments). Training of a deep learning model using training data before application of the present invention and that using learning data after application of the present invention data were performed, respectively, and the accuracies of the respective models were measured. The first model, model 1, was trained using the training data before data augmentation according to the embodiment techniques. The second model, model 2, was trained using the training data after data augmentation with the method according to some embodiments the present invention was applied. Test data began as one video file with 18 test labels (or 18 target action segments). The resulting accuracy of model 1: 27.8%, and the resulting accuracy of model 2: 55.6%. The detection accuracy using the test data is 27.8% where the training was performed using the data before the augmentation and is 55.6% where the training was performed using the data after the augmentation, and thus the effects of some embodiments of the present invention have been verified.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

We: this document may use the word "we," and this should be generally be understood, in most instances, as a pronoun style usage representing "machine logic of a computer system," or the like; for example, "we processed the data" should be understood, unless context indicates otherwise, as "machine logic of a computer system processed the data"; unless context affirmatively indicates otherwise, "we," as used herein, is typically not a reference to any specific human individuals or, indeed, and human individuals at all (but rather a computer system).

What is claimed is:

1. A computer-implemented method (CIM) comprising:
receiving a machine learning training dataset including at least one video; and
for at least one video of the machine learning training dataset:
dividing frames of the at least one video into sets of smaller sub-frames, where each subframe corresponds to the same area of a given frame throughout the at least one video,
determining, for each subframe of the at least one video, a cumulative quantity of pixel differences between a given subframe of a first frame and the given subframe of a final frame,
selecting a subframe of the frames of the at least one video for cropping based, at least in part, on the cumulative quantity of pixel differences,
cropping at least one copy of the at least one video based, at least in part, on the selected subframe of the frames of the at least one video, and
augmenting the machine learning training dataset with the cropped at least one copy of the at least one video.

2. The CIM of claim 1, further comprising:
training a machine learning algorithm with the augmented machine learning dataset as input.

3. The CIM of claim 1, wherein the sets of smaller sub-frames corresponds to a number of equal sized portions of the frames, where a number of divisions along a horizontal axis of the frames corresponds to an equal number of divisions along a vertical axis of the frames.

4. The CIM of claim 1, wherein cropping at least one copy of the at least one video further comprises:
expanding the selected subframe to include more content of the at least one video; and
generating a copy of the at least one video where each frame of the copy is cropped to exclude visual content that is excluded from the expanded selected subframe.

5. The CIM of claim 4, wherein:
expanding the selected subframe to include more content of the at least one video includes a plurality of different expansion transformations resulting in a plurality of different expanded subframes, with each different expanded subframe including a different quantity of visual content of the frames of the at least one video dataset; and
each expanded subframe further includes a plurality of additional repositioned expanded subframes, where each additional repositioned subframe corresponds to a copy of a given expanded subframe that has been repositioned such that visual content of the selected subframe remains included in the additional repositioned expanded subframe.

6. The CIM of claim 4, wherein a degree of expansion for expanding the subframe is based on a difference value corresponding to the difference of the cumulative quantity of pixel differences of the selected subframe and an average of the cumulative quantity of pixel differences of the remaining subframes of the set of subframes that were not selected.

7. A computer program product (CPP) comprising:
a machine readable storage device; and
computer code stored on the machine readable storage device, with the computer code including instructions for causing a processor(s) set to perform operations including the following:
receiving a machine learning training dataset including at least one video, and
for at least one video of the machine learning training dataset:
dividing frames of the at least one video into sets of smaller sub-frames, where each subframe corresponds to the same area of a given frame throughout the at least one video,
determining, for each subframe of the at least one video, a cumulative quantity of pixel differences between a given subframe of a first frame and the given subframe of a final frame,
selecting a subframe of the frames of the at least one video for cropping based, at least in part, on the cumulative quantity of pixel differences,
cropping at least one copy of the at least one video based, at least in part, on the selected subframe of the frames of the at least one video, and
augmenting the machine learning training dataset with the cropped at least one copy of the at least one video.

8. The CPP of claim 7, wherein the computer code further includes instructions for causing the processor(s) set to perform the following operations:
training a machine learning algorithm with the augmented machine learning dataset as input.

9. The CPP of claim 7, wherein the sets of smaller sub-frames corresponds to a number of equal sized portions of the frames, where a number of divisions along a horizontal axis of the frames corresponds to an equal number of divisions along a vertical axis of the frames.

10. The CPP of claim 7, wherein cropping at least one copy of the at least one video further comprises:
expanding the selected subframe to include more content of the at least one video; and
generating a copy of the at least one video where each frame of the copy is cropped to exclude visual content that is excluded from the expanded selected subframe.

11. The CPP of claim 10, wherein:
expanding the selected subframe to include more content of the at least one video includes a plurality of different expansion transformations resulting in a plurality of different expanded subframes, with each different expanded subframe including a different quantity of visual content of the frames of the at least one video dataset; and
each expanded subframe further includes a plurality of additional repositioned expanded subframes, where each additional repositioned subframe corresponds to a copy of a given expanded subframe that has been repositioned such that visual content of the selected subframe remains included in the additional repositioned expanded subframe.

12. The CPP of claim 10, wherein a degree of expansion for expanding the subframe is based on a difference value corresponding to the difference of the cumulative quantity of pixel differences of the selected subframe and an average of the cumulative quantity of pixel differences of the remaining subframes of the set of subframes that were not selected.

13. A computer system (CS) comprising:
a processor(s) set;
a machine readable storage device; and computer code stored on the machine readable storage device, with the computer code including instructions for causing the processor(s) set to perform operations including the following:
  receiving a machine learning training dataset including at least one video, and
  for at least one video of the machine learning training dataset:
    dividing frames of the at least one video into sets of smaller sub-frames, where each subframe corresponds to the same area of a given frame throughout the at least one video,
    determining, for each subframe of the at least one video, a cumulative quantity of pixel differences between a given subframe of a first frame and the given subframe of a final frame,
    selecting a subframe of the frames of the at least one video for cropping based, at least in part, on the cumulative quantity of pixel differences,
    cropping at least one copy of the at least one video based, at least in part, on the selected subframe of the frames of the at least one video, and
    augmenting the machine learning training dataset with the cropped at least one copy of the at least one video.

14. The CS of claim 13, wherein the computer code further includes instructions for causing the processor(s) set to perform the following operations:
  training a machine learning algorithm with the augmented machine learning dataset as input.

15. The CS of claim 13, wherein the sets of smaller sub-frames corresponds to a number of equal sized portions of the frames, where a number of divisions along a horizontal axis of the frames corresponds to an equal number of divisions along a vertical axis of the frames.

16. The CS of claim 13, wherein cropping at least one copy of the at least one video further comprises:
  expanding the selected subframe to include more content of the at least one video; and
  generating a copy of the at least one video where each frame of the copy is cropped to exclude visual content that is excluded from the expanded selected subframe.

17. The CS of claim 16, wherein:
  expanding the selected subframe to include more content of the at least one video includes a plurality of different expansion transformations resulting in a plurality of different expanded subframes, with each different expanded subframe including a different quantity of visual content of the frames of the at least one video dataset; and
  each expanded subframe further includes a plurality of additional repositioned expanded subframes, where each additional repositioned subframe corresponds to a copy of a given expanded subframe that has been repositioned such that visual content of the selected subframe remains included in the additional repositioned expanded subframe.

18. The CS of claim 16, wherein a degree of expansion for expanding the subframe is based on a difference value corresponding to the difference of the cumulative quantity of pixel differences of the selected subframe and an average of the cumulative quantity of pixel differences of the remaining subframes of the set of subframes that were not selected.

* * * * *